Patented Nov. 5, 1935

2,019,844

UNITED STATES PATENT OFFICE 2,019,844

AZODYESTUFF

Heinrich Clingestein, Cologne-on-the-Rhine, and Karl Dobmaier, Leverkusen-I. G. Werk, Germany, assignors to General Aniline Works, Inc., New York, N. Y., a corporation of Delaware No Drawing. Application November 3, 1932, Serial No. 641,118. In Germany November 11, 1931

8 Claims. (Cl. 260—87)

The present invention relates to new azodyestuffs, more particularly it relates to dyestuffs which may be represented by the probable general formula:

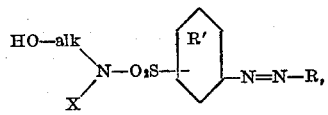

wherein HO-alk stands for hydroxyalkyl, such as hydroxy-methyl, -ethyl, -propyl, -butyl, -isobutyl and the like, R stands for the radical of a coupling component suitable for producing an azodyestuff which has been coupled in an alkaline medium, said coupling component containing as substituent at least a sulfonic or carboxylic acid group, X stands for hydrogen, alkyl, aryl, hydroxyalkyl or hydroaryl, such as methyl, ethyl, propyl, butyl, isobutyl, phenyl, hydroxymethyl, hydroxyethyl, hydroxypropyl, hydroxybutyl, hydroxyisobutyl, cyclohexyl and piperidyl, and wherein the nucleus R' may be substituted by alkyl, such as methyl, ethyl, propyl, butyl, isobutyl, hydroxyl, alkoxy, such as methoxy, ethoxy, a substituted amino group, such as methylamino, ethylamino, acetylamino, benzoylamino, halogen and the nitro group.

As coupling components there come into consideration for the purpose of our invention all those components generally used in the art of producing azodyestuffs and coupling in an alkaline medium; by way of example, there may be mentioned coupling components of the benzene-, naphthalene- and pyrazolone series containing as substituent a sulfonic or carboxylic acid group, and which may bear further substituents, for instance, alkyl, alkoxy, halogen, the nitro group, hydroxyl, the amino group, a substituted amino group, such as acetylamino, benzoylamino, methylamino and ethylamino. Suitable coupling components are for example, salicylic acid, ethylbenzylaniline-sulfonic acid of the formula:

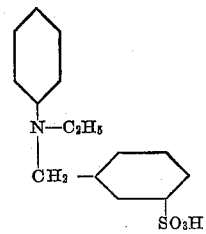

aminonaphthol-sulfonic acids, pyrazolone-carboxylic acids and sulfo- and carboxyphenyl-pyrazolones.

Our new dyestuffs are obtainable by diazotizing in the usual manner with sodium nitrite and hydrochloric acid an amine of the general formula:

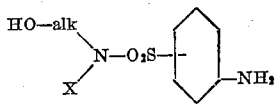

wherein "alk" and X are to be specified as stated above, and coupling in an alkaline medium with a coupling component suitable for producing an azodyestuff, said coupling component containing at least a carboxylic acid or a sulfonic acid group as substituent.

Our new dyestuffs are in form of their alkali metal salts generally yellowish to orange to red to brown powders, soluble in water, dyeing animal fibres yellow to orange to red to brown shades of good fastness properties, especially to fulling.

Compared with the analogous dyestuffs containing no hydroxy group in the alkyl radical of the sulfonealkylamide group, the dyestuffs according to the invention are distinguished by having an improved solubility in water and by yielding more even shades.

The invention is illustrated by the following examples, without being limited thereto:

Example 1.—21.7 parts by weight of 1-aminobenzene-3-sulfohydroxyethylamide, prepared by condensation of 1-nitrobenzene-3-sulfonic acid chloride and aminoethylalcohol, followed by reduction, are diazotized in the usual manner. The diazo solution is slowly introduced into a soda-alkaline solution prepared from 43 parts by weight of 1-ω-chloroacetyl-amino-8-hydroxynaphthalene-4,6-disulfonic acid, and when the coupling is complete, the dyestuff, having in its free state the following formula:

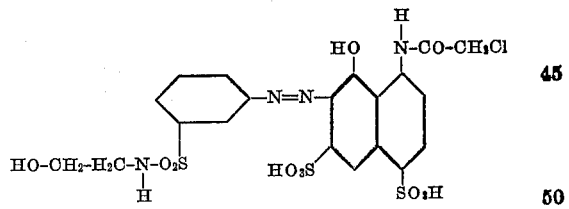

is salted out. It dyes wool clear red even shades of excellent fastness to fulling.

By substituting the 1-ω-chloracetyl-8-hydroxynaphthalene-4,6-disulfonic acid by 31.5 parts by weight of phenylamino-8-hydroxynaphthalene- 6-sulfonic acid, there is obtained a dyestuff yielding brown shades.

By substituting the 1-chloracetylamino-8-hydroxynaphthalene-4,6-disulfonic acid by an equimolecular quantity of a pyrazolone, especially a 1-(chlorosulfophenyl)-3-methyl - 5 - pyrazolone, such as 1-(2'-chloro-4'-sulfophenyl)-3-methyl-5 - pyrazolone, 1-(2' - chloro-5' - sulfophenyl)-3-methyl-5-pyrazolone, and 1-(2'.5'-dichloro-4'-sulfophenyl)-3-methyl-5-pyrazolone, there are obtained dyestuffs dyeing wool greenish-yellow even shades of good fastness to fulling.

*Example 2.*—26.2 parts by weight of 1-aminobenzene - 3 - sulfo-di-(hydroxyethylamide), prepared by condensation of 1-nitrobenzene-3-sulfonic acid chloride with di-hydroxyethylamine of the formula:

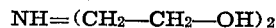

followed by reduction, are diazotized in the usual manner and coupled in a soda-alkaline solution with 42.6 parts by weight of 1-(ω-chloroacetylamino) - 8 - hydroxynaphthalene-4,6 - disulfonic acid. The dyestuff dyes wool vivid bluish-red shades of good evenness. In its free state it has the following formula:

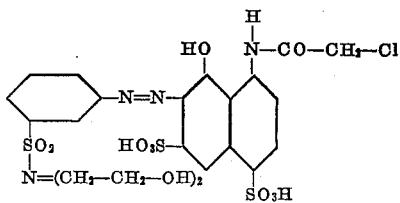

*Example 3.*—23.3 parts by weight of 1-aminobenzene - 4 - sulfohydroxypropylamide, prepared by condensation of 1-acetylaminobenzene-4-sulfonic acid chloride and aminopropylalcohol, followed by saponification of the acetylamino group, are coupled in soda-alkaline solution with 22.4 parts by weight of 1-hydroxynaphthalene-4-sulfonic acid. The dyestuff having in its free state the following formula:

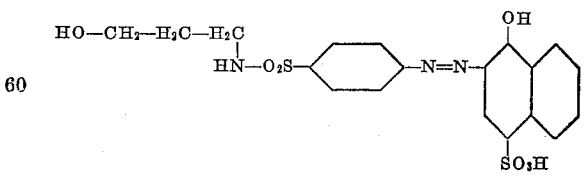

dyes wool orange shades of good evenness.

By substituting the 1-hydroxynaphthalene-4-sulfonic acid by 38.2 parts by weight of 2-acetylamino-8 - hydroxynaphthalene - 6 - sulfonic acid there is obtained a dyestuff dyeing yellowish-red shades.

*Example 4.*—24.8 parts by weight of 1-methoxy-2-amino-4-benzene - sulfohydroxyethylamide are diazotized and coupled with 39 parts by weight of 1-acetylamino - 8 - hydroxynaphthalene - 4,6 - disulfonic acid in soda-alkaline solution. The dyestuff having in its free state the following formula:

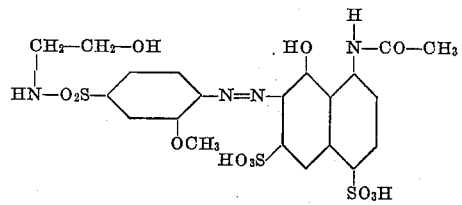

is, after isolation and drying, obtained as reddish-brown powder, dyeing wool bluish-red shades of good evenness and fastness to fulling.

*Example 5.*—31.5 parts by weight of 1-aminobenzene - 3 - sulfohydroxyethylcyclohexylamide, prepared by condensation of nitrobenzene-3-sulfonic acid chloride and hydroxyethylcyclohexylamine, followed by reduction of the nitro group, are coupled in soda-alkaline solution with 39 parts by weight of 1-acetylamino-8-hydroxynaphthalene-3,6-disulfonic acid. The dyestuff having in its free state the following formula:

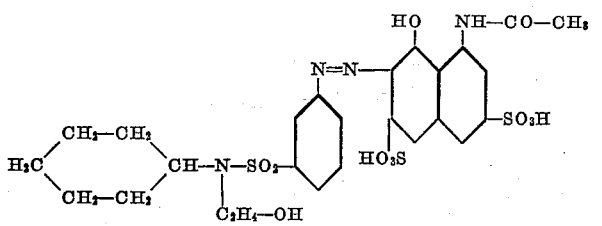

dyes wool bluish-red shades of good fastness to fulling.

We claim:
1. Azodyestuffs of the general formula:

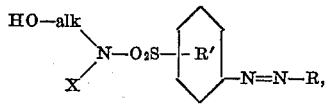

wherein "HO-alk" stands for a hydroxyalkyl group, X stands for hydrogen, alkyl, aryl, hydroxyalkyl or hydroaryl, R stands for the radical of a coupling component suitable for producing an azodyestuff which has been coupled in an alkaline medium, said coupling component containing as substituent at least a sulfonic or carboxylic acid group, and wherein the benzene nucleus R' may be substituted by substituents selected from the group consisting of alkyl, alkoxy, hydroxyl, a substituted amino group, the nitro group and halogen, being in form of their alkali metal salts generally yellowish to orange to red to brown powders, soluble in water, dyeing animal fibres generally yellow to orange to red to brown shades of good fastness to fulling.

2. Azodyestuffs of the general formula:

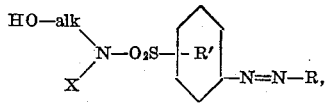

wherein "HO-alk" stands for a hydroxyalkyl group, X stands for hydrogen, alkyl, aryl, hydroxyalkyl or hydroaryl, R stands for the radical of a coupling component suitable for producing an azodyestuff of the naphthalene or pyrazolone series which has been coupled in an alkaline medium, said coupling component containing as substituent at least a sulfonic acid group, and wherein the benzene nucleus R' may be substituted by substituents selected from the group consisting of alkyl, alkoxy, hydroxyl, a substituted amino group, the nitro group and halogen, being in form of their alkali metal salts generally yellowish to orange to red to brown powders, soluble in water, dyeing animal fibres generally yellow to orange to red to brown shades of good fastness to fulling.

3. Azodyestuffs of the general formula:

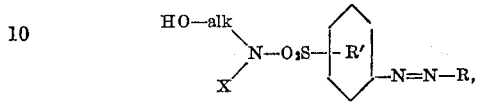

wherein "HO-alk" stands for a hydroxyalkyl group, X stands for hydrogen, alkyl, aryl, hydroxyalkyl or hydroaryl, R stands for the radical of a 1-(chlorosulfophenyl)-3-methyl-5-pyrazolone, and wherein the benzene nucleus R' may be substituted by substituents selected from the group, consisting of alkyl, alkoxy, hydroxyl, a substituted amino group, the nitro group and halogen, being in form of their alkali metal salts generally yellowish powders, soluble in water, dyeing animal fibres generally yellow shades of good fastness to fulling.

4. Azodyestuffs of the general formula:

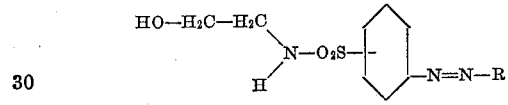

wherein R stands for the radical of a 1-(chlorosulfophenyl)-3-methyl-5-pyrazolone, being in form of their alkali metal salts generally yellowish powders, soluble in water, dyeing animal fibres yellow shades of good fastness to fulling.

5. The azodyestuff of the following formula:

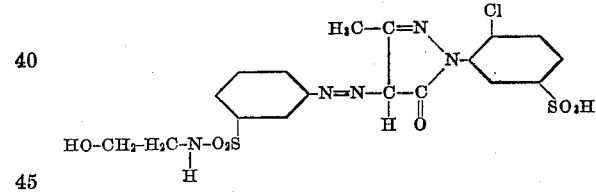

being in the form of its alkali metal salts a yellow powder, dyeing wool yellow shades of good fastness to fulling.

6. Azodyestuffs of the general formula:

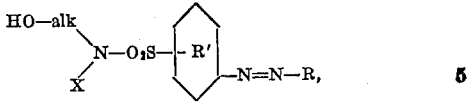

wherein "HO-alk" stands for a hydroxyalkyl group, X stands for hydrogen, alkyl, aryl, hydroxyalkyl or hydroaryl, R stands for the radical of a hydroxynaphthalene-sulfonic acid which has been coupled in an alkaline medium and which may be substituted by acylamino, and wherein the benzene nucleus R' may be substituted by substituents of the group consisting of alkyl, alkoxy, hydroxyl, a substituted amino group, the nitro group and halogen, being in form of their alkali metal salts generally orange to red to brown powders, soluble in water, dyeing animal fibres generally orange to red to brown shades of good fastness to fulling.

7. Azodyestuffs of the general formula:

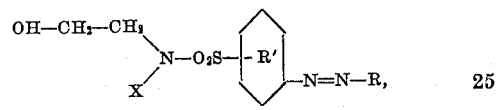

wherein X stands for hydrogen or hydroxyethyl, and R stands for the radical of the hydroxy-naphthalene-sulfonic acid which may be substituted by acylamino, being in form of their alkali metal salts generally orange to red to brown powders, soluble in water, dyeing animal fibres generally orange to red to brown shades of good fastness to fulling.

8. The azodyestuff of the following formula:

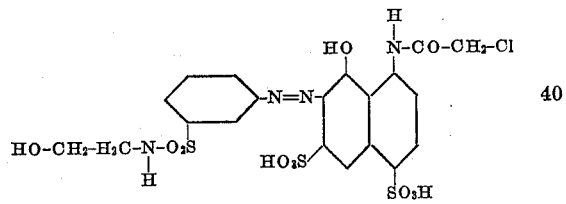

dyeing wool clear red even shades of excellent fastness to fulling.

HEINRICH CLINGESTEIN.
KARL DOBMAIER.